Jan. 29, 1957 H. W. KNOX 2,779,060
TIRE MOLD
Filed May 13, 1953 2 Sheets-Sheet 2
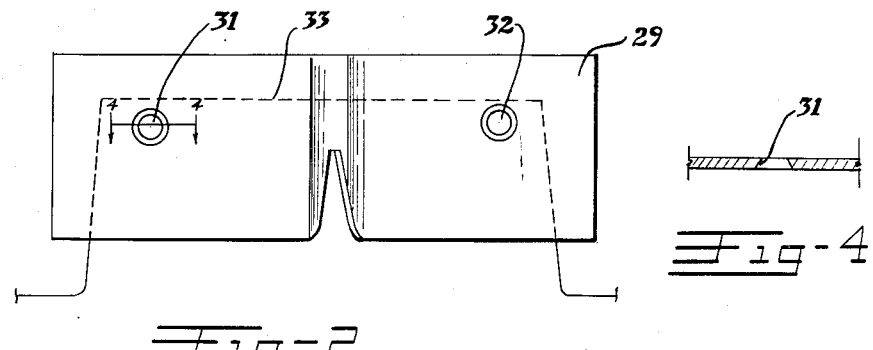
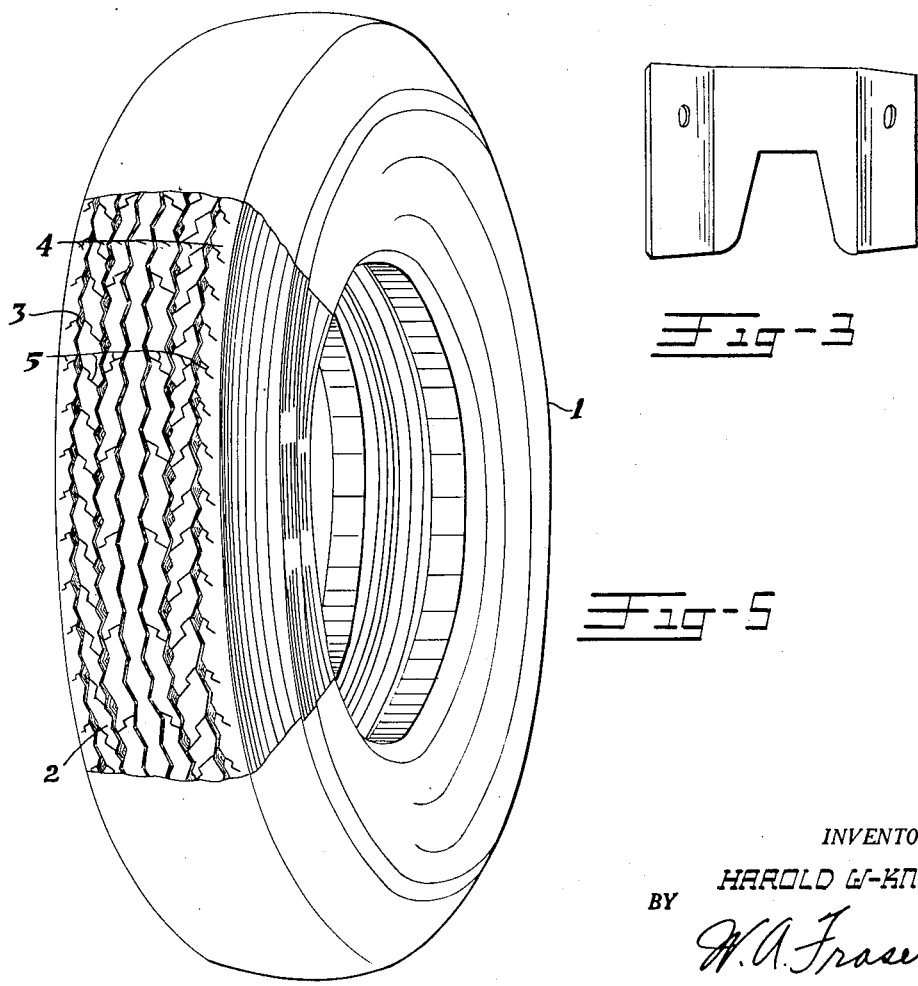
INVENTOR.
HAROLD W. KNOX
BY
W. A. Fraser

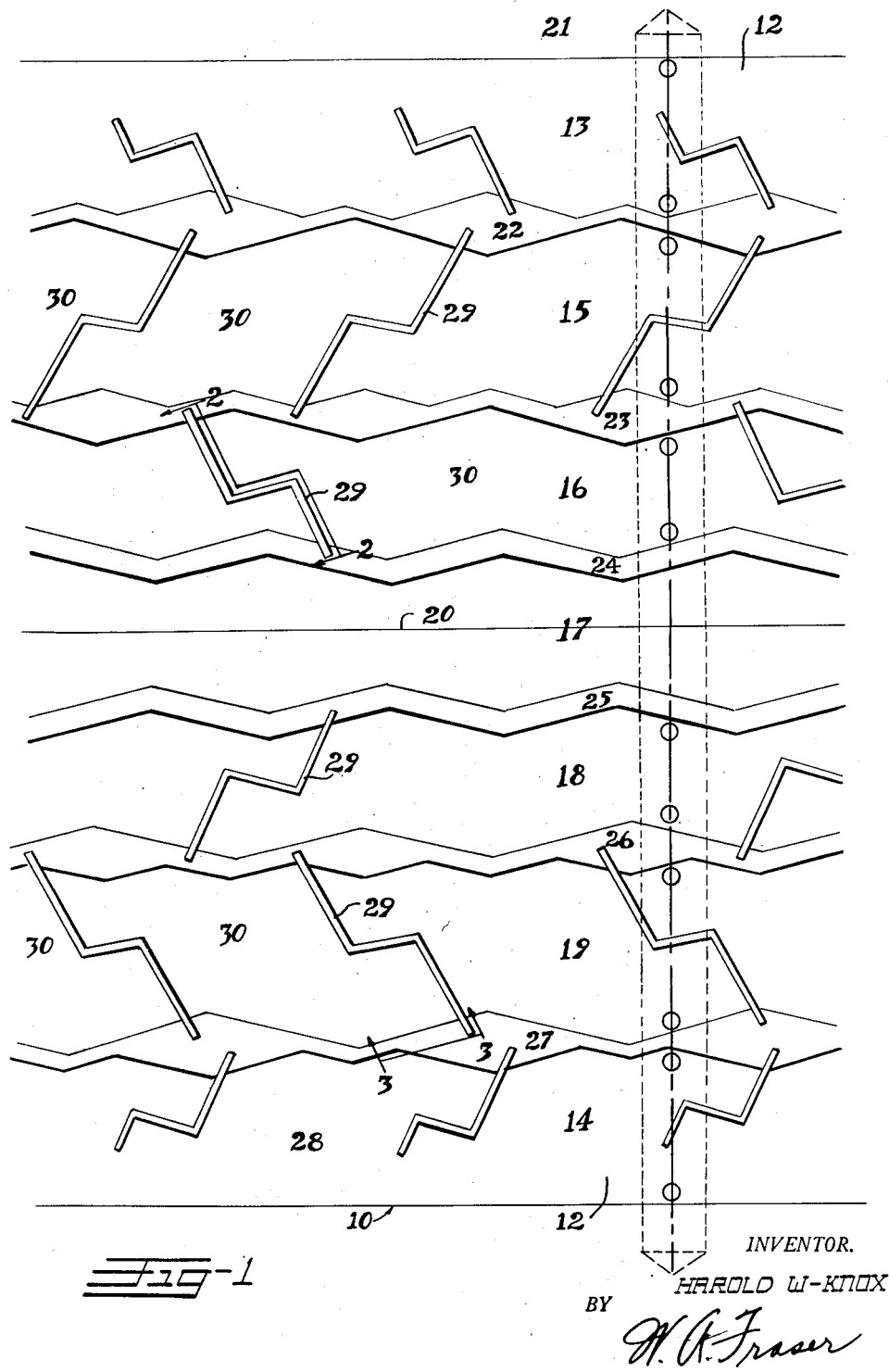

2,779,060
TIRE MOLD

Harold W. Knox, Akron, Ohio, assignor to The Firestone Tire & Rubber Company, Akron, Ohio, a corporation of Ohio Application May 13, 1953, Serial No. 354,835

2 Claims. (Cl. 18—38)

This invention relates to a mold comprising in combination separable body members having registering recesses therein which together constitute a mold opening conforming in shape to the exterior of a tire to be molded, and it relates more particularly to molds for automobile tires of the type adapted to mold grooves in the rubber tread, which grooves will be approximately 1/16 of an inch or less in width.

It has been found that transverse slits or very narrow grooves in the traction elements of the tread of a tire will provide said tire with more traction, or road gripping power, and hence quicker stopping. Heretofore, a substitute for such narrow grooves has been numerous knife cuts in the tread of the tire after it has been cured. Such cutting requires extra labor and equipment which adds considerably to the cost of the product.

To mold the narrow grooves referred to above, the tire mold is provided with thin metal plates, which are forced into place and held therein by the backing of the main mold, as is well-known in the art. It has become desirable, in tread patterns having circumferentially extending endless or long grooves in the mold, to form a corresponding rib traction element on a tire, to provide said thin metal plates extending entirely across the groove in the mold and from the bottom to or near the top of the groove. While such a construction has been recognized as desirable in many tread designs, such a mold construction has presented a serious problem of mold venting to the industry. In molding tires, it is a common practice to provide radially extending vents opening on the inner surface of the mold at points in the tread design where air otherwise would trap during the molding of the tire. As the desirability of the narrow grooves extending completely across the ribs of ribtype tire treads came to be recognized by tire engineers, one of the problems of such construction was the additional trapping of air in the numerous chambers formed as the tire was molded, said chambers being formed by the tire tread, the thin metal plates, the metal ribs in the mold forming the grooves in the tire tread, and the bottom of the mold groove. Before the present invention, each one of these numerous chambers required one or more vents into the body of the mold which added to the total required venting of such molds to such an extent as to add substantially to the cost of removing vents and seriously detracted from the appearance of the tires.

The extent of the problem of mold venting in ribtype tire tread constructions having narrow grooves completely across the ribs, the narrow grooves being spaced at short intervals along the ribs to provide the desired traction, is illustrated by reference to an 8.00–15 tire mold of the design shown in Fig. 1. In the actual experience of a large manufacturer of tires, the radial venting of the tire tread portion of the mold for this tire having the plates 29 shown in Figure 1 without the vents 31 and 32 requires 744 vents into the body of the mold, but with vents 31 and 32 in plates 29 only 144 such vents into the body of the mold are required.

It is an object of the present invention to eliminate the necessity for additional venting of the body of the tire mold which has heretofore been necessary in the event of the use of numerous said narrow plates extending completely across circumferentially extending tread grooves in the tire mold.

Other objects and advantages of the invention will be apparent to those familiar with the art by reference to the following drawings, wherein:

Fig. 1 is a fragmentary plan view showing thin metal plates in the form of auxiliary inserts in position in a mold embodying the present invention;

Fig. 2 is an enlarged fragmentary sectional view taken on line 2—2 of Fig. 1 showing the auxiliary insert or plate only and indicating by a broken line the depth said plate is embedded in the body of the mold;

Fig. 3 is an enlarged fragmentary sectional view taken on line 3—3 of Fig. 1;

Fig. 4 is a sectional view on line 4—4 of Fig. 2; and

Fig. 5 is a perspective view of a tire molded in a mold of which Fig. 1 illustrates a fragment.

Referring to the drawings, there is shown in Fig. 1 a plan view of a mold referred to generally as 10. Mold 10 is of the type commonly used in the automobile tire industry and is composed of two mating sections 11 and 12. The tire tread design of this mold comprises shoulder grooves 13, 14 and intermediate grooves 15, 16, 17, 18 and 19, groove 17 being a center groove disposed at the parting line 20 of the mold. Said grooves are defined by ribs 21, 22, 23, 24, 25, 26, 27 and 28 as will be seen by reference to Fig. 1. Grooves 15, 16, 18 and 19 have radially inwardly extending thin, angular, notched plates 29, which plates have their bottom and side edges embedded in the body of the mold and the sides of adjoining ribs respectively. Said plates rise from the bottom of the grooves and extend substantially to the top of the grooves in which they are located. Said plates 29 together with their adjacent ribs and the body of the mold form numerous chambers 30 in the tread tire design of the mold as will also be seen by reference to the drawings. Plates 29 extend across the grooves in an angular direction, but it is to be understood that they may extend axially, arcuately, or in any direction desired.

Referring now to Fig. 2, it will be seen that each plate is provided with an opening 31 and 32 at points outside dotted line 33, dotted line 33 indicating the depth the plates 29 are inserted in the main body and ribs of the mold. It will thus be seen by reference to Fig. 1 that chambers 30 of mold grooves 15, 16, 18 and 19 communicate through said openings 31 and 32 whereby air, which, but for these openings, may be trapped in such chambers during the molding of a tire, may travel along said grooves 15, 16, 18 and 19 to a point where such grooves communicate with a radial vent, thereby providing means for escape of the air.

Referring now to Fig. 4, it will be seen that sides of openings or vents 31 are beveled so that one edge of the opening is very thin or sharp. Openings 32 have the same beveled sides as openings 31 and the purpose of providing thin or sharp edges to these openings is to facilitate the removal of a finished tire from the mold. During molding of a tire in mold 10, the tread rubber flows through openings 31 and 32 and in some cases will form a continuous rivet of rubber which must be broken or cut through in order to remove the tire from the mold, and when such continuous rivets are present, the sharp edges of the holes 31 and 32 cut or break through such rivets of rubber more easily than would be the case if the sides of the holes were not beveled.

While applicant has illustrated his invention in connection with a mold tire tread design having numerous thin plates extending across the grooves of the tread design, it will be obvious that the advantage of the invention will be in proportion to the number of chambers 30.

A pattern of the tire tread which is formed by the mold design shown in Fig. 1 is illustrated in the perspective view of the tire 1 shown in Fig. 5. It is to be noted that the ribs of tire 1 are functionally continuous, that is, there is no such gap at the narrow, angular, transverse grooves of the ribs as to leave the load carried by the rib unsupported by the rib. Before the present invention, each isolated block of the ribs of the tire 1 would require a radial vent which, as is known by those familiar with molding tires, each radial vent leaves a so-called pin-vent extending radially outwardly from the tire after molding. Such pin-vents must be removed either manually or by machine, but in any event, their removal is an expensive and difficult operation, and it is impossible to remove them without detracting from the appearance of the tire. Another objection to radial vents in tire molds is that the rubber does not always pull out of the vent hole and in that case, time must be taken to manually punch and free the hole of the rubber lodged therein. The faults just mentioned in connection with tire mold venting is in proportion to the number of radial vents in the mold and it will now be seen that applicant's invention, whereby such venting is kept at a minimum, is a substantial contribution to the art.

The detailed description of the particular embodiment of the invention illustrated and described herein is not to be construed as limiting the invention thereto. The invention includes all features of patentable novelty residing in the foregoing description and the accompanying drawings.

What is claimed is:

1. A mold for a pneumatic tire including in combination separable body members having registering recesses therein which together constitute a mold opening conforming in shape to the exterior contour of a tire to be molded, said mold having circumferentially extending grooves for forming functionally continuous tire tread ribs, thin plates disposed at short intervals in at least one of said grooves, said plates extending from the bottom of said grooves upwardly a substantial distance and completely across the groove in which they are located, said plates having perforations therethrough whereby the air in said grooves during the molding of a tire may pass through the plates and whereby the tire is provided with ribs having numerous narrow grooves extending completely across said ribs and opening at the road contact surface thereof, the sides of said perforations being beveled to a sharp edge for cutting through rubber that flows into said perforations during the molding of a tire in said mold.

2. A mold for a pneumatic tire including in combination separable body members having registering recesses therein which together constitute a mold opening conforming in shape to the exterior contour of a tire to be molded, said mold having circumferentially extending grooves for forming functionally continuous tire tread ribs, thin plates disposed at short intervals in at least one of said grooves, said plates extending from the bottom of said grooves upwardly a substantial distance and completely across the groove in which they are located, said plates having perforations therethrough whereby the air in said grooves during the molding of a tire may pass through the plates and whereby the tire is provided with ribs having numerous narrow grooves extending completely across said ribs and opening at the road contact surface thereof, the sides of said perforations being beveled to a thin edge for cutting through rubber that flows into said perforations during the molding of a tire in said mold.

References Cited in the file of this patent

UNITED STATES PATENTS

| 2,224,337 | Bostwick | Dec. 10, 1940 |
| 2,298,729 | Zimmerman | Oct. 13, 1942 |
| 2,587,297 | Duerksen | Feb. 26, 1952 |

FOREIGN PATENTS

| 781,104 | France | Feb. 18, 1935 |